(12) United States Patent
Earl et al.

(10) Patent No.: US 10,133,147 B2
(45) Date of Patent: Nov. 20, 2018

(54) SCALABLE SOURCE OF QUANTUM ENTANGLED PHOTONS

(71) Applicant: QUBITEKK, INC., Bakersfield, CA (US)

(72) Inventors: Dennis Duncan Earl, San Diego, CA (US); Clifford Allen Bishop, Nashville, IL (US)

(73) Assignee: QUBITEKK, INC., Bakersfield, CA (US)

( * ) Notice: Subject to any disclaimer, the term of this patent is extended or adjusted under 35 U.S.C. 154(b) by 0 days.

(21) Appl. No.: 15/306,991

(22) PCT Filed: Apr. 27, 2015

(86) PCT No.: PCT/US2015/027848
§ 371 (c)(1),
(2) Date: Oct. 26, 2016

(87) PCT Pub. No.: WO2015/168039
PCT Pub. Date: Nov. 5, 2015

(65) Prior Publication Data
US 2017/0052427 A1 Feb. 23, 2017

Related U.S. Application Data

(60) Provisional application No. 61/985,375, filed on Apr. 28, 2014.

(51) Int. Cl.
*G02F 1/35* (2006.01)
*G02F 1/39* (2006.01)
*G02B 27/28* (2006.01)
*G02B 27/14* (2006.01)

(52) U.S. Cl.
CPC .......... *G02F 1/3501* (2013.01); *G02B 27/286* (2013.01); *G02F 1/39* (2013.01); *G02B 27/141* (2013.01); *G02F 2001/3503* (2013.01); *G02F 2001/3505* (2013.01); *G02F 2001/3507* (2013.01)

(58) Field of Classification Search
None
See application file for complete search history.

(56) References Cited

U.S. PATENT DOCUMENTS

| | | |
|---|---|---|
| 5,218,610 A | 6/1993 | Dixon |
| 5,675,436 A | 10/1997 | Damen et al. |
| 6,424,665 B1 | 7/2002 | Kwiat et al. |
| 7,649,680 B2 * | 1/2010 | Onishi ............... G02B 27/1006 359/326 |
| 2004/0042513 A1 | 3/2004 | Teich et al. |
| 2007/0070501 A1 | 3/2007 | Wen et al. |

(Continued)

OTHER PUBLICATIONS

International Search Report and Written Opinion dated Jul. 27, 2015 in PCT/US2015/027848 (9 pages).

*Primary Examiner* — Tina Wong
(74) *Attorney, Agent, or Firm* — Acuity Law Group, PC; Michael A. Whittaker (57) ABSTRACT

The present invention provides devices, systems, and methods for producing bi-photons and/or entangled photons without the need for complex alignment or source design by the user. The invention provides a scalable source of high-brightness, high-visibility, bi-photons and entangled photons that can be configured for a number of applications.

25 Claims, 8 Drawing Sheets

(56) References Cited

U.S. PATENT DOCUMENTS

2009/0016386 A1 1/2009 Edamatsu et al.
2009/0103736 A1 4/2009 Pacher et al.
2009/0207480 A1 8/2009 Onishi et al.

\* cited by examiner

SCALABLE SOURCE OF QUANTUM ENTANGLED PHOTONS

CROSS-REFERENCE TO RELATED APPLICATIONS

The present invention is filed under 35 U.S.C. § 371 as the U.S. national phase of International Application No. PCT/US2015/027848, filed Apr. 27, 2015, which designated the U.S. and claims the benefit of U.S. Provisional Application Ser. No. 61/985,375, filed on Apr. 28, 2014, the entire disclosure of each of which is incorporated herein by reference, including the drawings.

FIELD OF THE INVENTION

The present invention relates the field of quantum entangled photons and ways to generate them reliably and in a commercially-viable manner for use in any of a variety of applications, including but not limited to quantum computing, quantum sensing, and quantum encryption and communication systems.

BACKGROUND OF THE INVENTION

The following discussion of the background of the invention is merely provided to aid the reader in understanding the invention and is not submitted to describe or constitute prior art to the present invention.

Quantum entanglement is a quantum mechanical phenomenon in which the quantum states of two or more objects have to be described with reference to each other, even though the individual objects may be spatially separated. This is in sharp contrast to classical physics—where particle properties and behaviors depend purely on local conditions. Objects are said to be "entangled" when a plurality (e.g., two or more) objects interact in ways such that the quantum state of each particle cannot be described independently—instead, a quantum state must be given for the system as a whole. Examples of entangled states include position, angular momentum, spin, polarization, energy, and time.

Quantum theory was developed in the early 1900's when classical physics could not explain the behavior of atomic and sub-atomic systems or weak fields. There are many unusual properties which occur at the sub-atomic level, one of which is known as entanglement.

Historically, entanglement was first recognized by Einstein, Podolsky, and Rosen (A. Einstein, B. Podolsky, and N. Rosen, "Can quantum-mechanical description of physical reality be considered complete?", Phys. Rev. 47 777 (1935)) and Schrodinger (E. Schrodinger, "Discussion of probability relations between separated systems", Proceedings of the Cambridge Philosophical Society, 31: 555-563 (1935); 32: 446-451 (1936)). Over the years, quantum entanglement has been recognized as a physical resource. Like energy, entanglement can be measured and transformed. The recent development of quantum information theory has shown that entanglement can have important practical applications.

The first known experiment showing polarization measurements on two opposite propagating photons was published by Pryce and Ward (M. Pryce and J. Ward, "Angular correlation effects with annihilation radiation", Nature 160, 435 (1947)). The early demonstrations of photonic entanglement were centered on annihilation processes, e.g., the decay of gamma particles and the photon emissions which followed. Later, in late 1960s, researchers began to connect the emission of optical entanglement with parametric interactions.

Parametric interactions, which were first studied by Faraday and Lord Rayleigh in the nineteenth century, received renewed attention during this time as a result of their ability to be utilized as microwave amplifiers. Optical parametric interactions within a nonlinear crystal are viewed positively today, in part because they can be utilized for production of entanglement. In contrast, these interactions were viewed as being detrimental to the desired effects of the 1960s. The sentiment changed from "optical parametric noise" to "parametric down-conversion," largely due to the work of Burnham and Weinberg (D. Burnham and D. Weinberg, "Observation of simultaneity in parametric production of optical photon pairs", Phys. Rev. Lett. 25, 84 (1970)).

Quantum information science has only recently become a widely recognized field of scientific inquiry. Interest and developments in the field increased greatly in 1994 when Peter Shor discovered a quantum algorithm for factoring large integers in polynomial time (P. Shor, in Proceedings of the 35th Annual Symposium on Foundations of Computer Science, S. Goldwasser, ed., (IEEE Computer Society, Los Alamitos, Calif.), pp. 124-134 (1994)). This discovery sparked a new interest in the abstract notion of quantum computing originally put forth by Paul Benioff, Richard Feynman and David Deutsch in the early 1980s.

The use of quantum effects for communication security were proposed around the same time, in the form of quantum key distribution (QKD) (C. Bennett and G. Brassard, "Quantum cryptography: Public-key distribution and coin tossing," in Proceedings of IEEE International Conference on Computers, Systems and Signal Processing, Bangalore, India, 1984, (IEEE Press, 1984), pp. 175-179; C. Bennett and G. Brassard, "Quantum public key distribution," IBM Technical Disclosure Bulletin 28, 3153-3163 (1985)). Today, commercial prototypes of many quantum technologies are on display. As the technology expands, the demand for more reliable and efficient entanglement sources has and likely will follow.

Quantum entanglement is required for long distance quantum communications and large-scale quantum computing networks. One of the most promising quantum computing architectures, measurement-based quantum computation, is also particularly well-suited for optical implementation. Currently, the best way for generating optical entanglement is via parametric down-conversion, formerly known as parametric noise. The quality of an entangled photon source is commonly characterized by its brightness, that is, the number of generated pairs per mW of pump power and per nm of generated bandwidth, as well as the purity of the entangled state, or visibility. Improvements in source brightness, visibility, and fidelity are constantly being sought.

Early success of parametric down-conversion for entanglement distribution came, primarily, from two major advances in methodology. These techniques, which exploit the geometry of non-collinear parametric down-conversion emissions, were both proposed and realized by Kwiat et al. (P. Kwiat, K. Mattle, H. Weinfurter, and A. Zeilinger, "New High-Intensity Source of Polarization-Entangled Photon Pairs", Physical Review Letters 75, 4337 (1995); P. Kwiat, E. Waks, A. White, I. Appelbaum, and P. Eberhard, "Ultrabright source of polarization-entangled photons", Physical Review A 60, 773 (1999)).

Early demonstrations of polarization entanglement primarily utilized beta-Barium Borate ($\beta$-$BaB_2O_4$, hereinafter "BBO") or Potassium Titanium Oxide Phosphate (KTiOPO$_4$, hereinafter "KTP") crystals that produced spatially-separated entangled beams.

More recently, progress has been made in the collinear regime. The success of collinear parametric down-conversion is due to a crystal manufacturing procedure that yields a periodic nonlinearity to the crystal structure. Emissions within periodically-poled crystals can occur with non-critically phase-matched configurations in materials with large nonlinear coefficients. This has led to significant increases in entangled source brightness (C. Kuklewicz, M. Fiorentino, G. Messin, F. Wong, and J. Shapiro, "High-flux source of polarization-entangled photons from a periodically poled KTiOPO4 parametric down-converter", Physical Review A 69, 013807 (2004)). Some of the brightest, high-visibility sources of polarization entangled photons demonstrated, to date, utilize periodically-poled crystals in a waveguide structure. Waveguide periodically-poled KTP allows a pair generation rate that is more than 50 times higher (or brighter) than the non-periodically poled, non-waveguide bulk crystal KTP generation rate (M. Fiorentino, S. Spillane, R. Beausoleil, T. Roberts, P. Battle, and M. Munro, "Spontaneous parametric down-conversion in periodically poled KTP waveguides and bulk crystals", Optics Express 15, 7479 (2007)).

Source performance also becomes better as new engineering techniques and models emerge, e.g. determination of optimal focusing techniques to enable better fiber coupling (R, Bennink, Y. Liu, D. Earl, and W. Grice. "Spatial distinguishability of photons produced by spontaneous parametric down-conversion", Physical Review A 74, 023802 (2006)). System design can help the performance as well, e.g. improved mounting of a non-linear crystal by encapsulating it within an optically clear material (P. Kwiat, PhD Thesis; "Nonclassical effects from spontaneous parametric down-conversion: adventures in quantum wonderland.").

Patents related to packaging an entangled photon source include U.S. Pat. No. 6,897,434, "All-fiber photon-pair source for quantum communications," issued May 24, 2005 to Kumar. Kumar describes a source and/or method of generating quantum-entangled photon pairs using parametric fluorescence in a fiber whose dispersion zero is close to that of the pump wavelength, and specifically, a Sagnac loop at wavelengths around 1550 nm, with detectors in "that window (1000-1600 nm)." A commercial product (EPS-1000) by the company NuCrypt, LLC, claims to practice the teachings of this patent.

Another patent, U.S. Pat. No. 6,424,665 to Kwiat, "Ultrabright source of polarization-entangled photons," describes a polarization entangled source using spontaneous parametric down-conversion in a multi-crystal geometry.

Emerging applications for quantum technology create an increasing demand for ever more stable, efficient, high-quality sources of entangled photons. There is therefore a need for a source that can be readily configured and provided to an end-user to produce a rugged, bright, and flexible source to serve the quantum sensing, quantum cryptography, and quantum computing fields.

SUMMARY OF THE INVENTION

It is an object of the present invention to provide systems and methods for producing bi-photons and/or entangled photons. As described hereinafter, the present invention provides a scalable system with tunable efficiency without the need for complex alignment or source design by the user.

In a first aspect, the present invention provides systems/devices for generating bi-photons and/or entangled photons. These systems comprise:

a nonlinear crystal element comprising a first face, a second face parallel to the first face, and a first axis perpendicular to the first and second faces;

a photon source configured to provide a pump beam traversing a first optical path to a first face of the nonlinear crystal element along the first axis, the nonlinear crystal element providing downconversion of a subset of photons in the pump beam to provide downconverted bi-photons and non-downconverted photons;

a beam splitter positioned in the first optical path between the photon source and the non-linear crystal, the beam splitter configured to direct photons reflected from the first face of the nonlinear crystal element onto a second optical path along a second axis;

a visualization element configured to receive photons traversing the second optical path from the beam splitter and to provide therefrom an image of the first face of the nonlinear crystal element;

a focusing optic configured to provide adjustment of the position of the pump beam relative to the first axis; and an optical element comprising a dichroic reflector configured to receive photons exiting a second face of the nonlinear crystal element along the first axis and to direct downconverted bi-photons to a third optical path along the first axis, and to direct non-downconverted photons to a fourth optical path along a third axis.

The term "bi-photon" refers to the simultaneous production of two photons in such a way as they are distinguishable, meaning they have optical properties (i.e. polarization, wavelength, etc.) that are related to some other distinguishing and measurable variable.

The term "entangled" refers to the simultaneous production of two photons in such a way as they are indistinguishable, meaning they have one or more physical properties (e.g., polarization, wavelength, etc.) that are not related to any distinguishing and/or measurable variable.

In certain preferred embodiments, the systems and devices of the present invention comprise a phase shifting wave plate positioned in the first optical path between the photon source and the first face of the nonlinear crystal element.

The phase shifting wave plate is a variable wave plate positioned in the first optical path between the photon source and the first face of the non-linear crystal. The skilled artisan understands that a variable wave plate (or retarder) is an optical device that slows the propagation of polarized light travelling through it along a defined axis. Variable wave plates may be constructed according to a variety of methods and from a variety of materials readily known to persons of ordinary skill in the art. In a typical example, a variable wave plate may be constructed from a liquid crystal device that allows the index of refraction of the wave plate material to be adjusted electronically. Such devices can comprise a transparent cell filled with a solution of liquid crystal (LC) molecules. Two parallel faces of the cell wall are coated with a transparent conductive film so that a voltage can be applied across the cell. The orientation of the LC molecules is determined by the alignment layer in the absence of an applied voltage. When an AC voltage is applied, the molecules will change from their default orientation based on the applied rms value of the voltage. Hence, the phase offset in a linearly-polarized beam of light can be actively controlled by varying the applied voltage.

In certain preferred embodiments, the systems and devices of the present invention can comprise a polarization rotating pre-crystal wave plate positioned in the first optical path between either the phase shifting wave plate, if present, and the first face of the non-linear crystal element, or the photon source, if the phase shifting wave plate is not present, and the first face of the nonlinear crystal. The polarization rotating pre-crystal wave plate may be a half-wave plate, quarter-wave plate, or variable wave plate. The skilled artisan understands that a wave plate (or retarder) is an optical device that can alter the polarization state of a light wave travelling through it. Two common types of fixed wave plates are the half-wave plate, which shifts the polarization direction of linearly polarized light, and the quarter-wave plate, which converts linearly polarized light into circularly polarized light and vice versa. Wave plates are typically constructed out of a birefringent material such as quartz or mica. As noted previously, the polarization rotating pre-crystal wave plate may also be an electronically variable wave plate, constructed and utilized in the manner previously discussed. In a preferred embodiment, the polarization rotating pre-crystal wave plate is a half wave plate configured manually to modify the polarization state of the pump beam, thereby altering the efficiency of downconverted bi-photon production by the system.

In preferred embodiments, the photon source is a laser. For ease of alignment, the photon source is preferably optically coupled to an optical fiber at a first end of the optical fiber, wherein the pump beam exits the optical fiber at a second end thereof, and wherein the second end of the optical fiber is positioned within a translating mount to provide the beam to focusing optic. This translating mount allows the optical axis of the photons exiting the photon source to be adjustable relative to the optical components in the beam path. By way of example, translation of the optical fiber can be used to align the pump beam along first axis such that it impinges on the first face of the nonlinear crystal element in a precise orientation (e.g., approximately centered on, and perpendicular to, the first face of the nonlinear crystal element). Once aligned during manufacture, the translating mount may be "locked down" so that no end user adjustment is necessary.

In certain embodiments, the systems and devices of the present invention can comprise a filter positioned in the first optical path between the photon source and the beam splitter. This filter is preferably configured to remove undesired wavelengths of light from reaching the beam splitter.

As noted above, the systems and devices of the present invention comprise a visualization element configured to receive photons traversing the second optical path from the beam splitter and to provide therefrom an image of the first face of the nonlinear crystal element. This advantageously allows visualization of the pump beam impinging on the first face of the nonlinear crystal element, thereby facilitating adjustment of the translation of the optical fiber for alignment of the pump beam in a precise orientation. Examples of suitable visualization elements include a CCD image sensor, a CMOS image sensor, an NMOS image sensor, an active pixel sensor, and an oversampled binary image sensor. This list is not meant to be limiting. In certain embodiments, the visualization element can be removed following manufacture and lockdown of the translating mount following alignment. Thus, a system/device of the invention shipped for use by an end user may lack the visualization element.

The nonlinear crystal element of the present invention may be made of a variety of materials known in the art, including but not limited LBO, CLBO, BBO, KTP, KDP, AGS, AGSE, SBN, BSO, $LiO_3$, and $LiNbO_3$. In certain embodiments, the nonlinear crystal element is a composite of materials. By way of example, a nonlinear crystal element can comprise two non-linear crystals separated by a half wave plate, or a plurality of non-linear crystals, each having a crystal axis oriented ninety degrees relative to an adjacent non-linear crystal. The nonlinear crystal element is selected to produce Type 0, I, or II downconversion of a portion of photons passing through the crystal matrix. A nonlinear crystal splits photons into pairs of photons that, in accordance with the law of conservation of energy, have combined energies and momenta equal to the energy and momentum of the original photon, are phase-matched in the frequency domain, and have correlated polarizations. Spontaneous parametric down-conversion (SPDC) in a certain low percentage of photon pairs are created at random times.

The nonlinear crystal is preferably potted in potting material having an index of refraction lower than the index of refraction of the non-linear crystal. Suitable materials are preferably optically transparent at the desired wavelengths. Suitable materials include silicone-based rubbers such as NuSil LS-6941 and LS-6140, Sylgard® Silicone Elastomer (Dow Corning), and ELASTOSIL® Solar 2202 (Wacker).

In a preferred embodiment, after exiting the second face of the nonlinear crystal, photons may be separated by a dichroic mirror into downconverted bi-photons along a first path, and non-downconverted photons along a second optical path. Downconverted bi-photons traveling along the first optical path exit the dichroic mirror and, in certain preferred embodiments, would travel through a polarization rotating post-crystal wave plate. The polarization rotating post-crystal wave plate may be a half-wave plate, quarter-wave plate, or variable wave plate. In a preferred embodiment, the polarization rotating post-crystal wave plate is a half wave plate configured manually to modify the polarization state of the downconverted photons.

In certain embodiments, a second beam splitter may be positioned along the first optical path and configured to receive the downconverted bi-photons and direct individual bi-photons in a bi-photon pair along separate optical paths. These separate optical paths may comprise, for example, separate optical fibers.

As described in additional detail hereinafter, the non-downconverted photons directed by the dichroic mirror down the second path may be "recycled" and used in the pump beam of the same device as part of the photon source, or may be used as the photon source for a pump beam in a second device of similar or identical configuration as the first device.

In certain preferred embodiments, an optical element is configured to focus the non-downconverted photons onto an end of a second optical fiber which emits the pump beam as indicated above, to the pump beam of the same device as part of the photon source, in which case the second optical fiber is one of the "2," or split, ends of a 2×1 fiber optic beam combiner that combines the recycled beam with the pump beam, in which case, the other end of the second optical fiber is the "1," or combined end of the 2×1 optic beam combiner and is preferably positioned within a translating mount to provide the combined beam to the focusing optic. In this embodiment, the photon source is be optically coupled to the other "2" or split end of the 2×1 optic beam combiner. A 2×1 optic beam combiner can be readily obtained from commercial sources, such as Thorlabs.

Optionally, as indicated above, the second optical fiber directs the non-downconverted photons to a second device, in which case the other end of the second optical fiber is preferably be positioned in a translating mount to facilitate focusing of the recycled beam on the non-linear crystal in the second device.

In certain preferred embodiments, the non-downconverted photons exiting the dichroic mirror travel through a polarization rotating recycling wave plate located between the dichroic mirror and the translating mount. The polarization rotating recycling wave plate may be a half-wave plate, quarter-wave plate, or variable wave plate. In a preferred embodiment, the polarization rotating recycling wave plate is a half wave plate configured manually to reverse the polarization modifications made to the pump beam photons by the polarization rotating pre-crystal wave plate.

Because the efficiency of downconversion is low, there is little loss of intensity in the recycled photon beam. The "recycled" pump beam can be provide to a second device which can also provide a "recycled" pump beam to a third device, which can provide a "recycled" pump beam to a fourth device, etc. This allows for scalability of the systems described herein, meaning one or more devices can be provided as a linked array, all receiving an initial "pump" from a single photon source at the first device, and other devices in the chain being linked to this single photon source through the recycled non-downconverted photons collected from the previous device in the series.

Furthermore, as described in additional detail hereinafter, by adjusting the polarization of the pump beam relative to the first axis individually in each of $dev_1$ through $dev_n$ (where $dev_1$ is device one and $dev_n$ is the nth, or final, device in the series) one is able to modify the efficiency of downconverted bi-photon production by each device in the series to be approximately identical.

In related aspects, the present invention provides methods of manufacturing, aligning, and tuning a scalable photon source. These methods comprise:
- providing devices $dev_1$ through $dev_n$ as described herein, wherein n=at least 2, wherein $dev_1$ comprises a laser as the photon source and $devs_{2\ to\ n}$ utilize non-downconverted photons from the fourth optical path of $dev_1$ as the photon source; and
- adjusting the polarization of the pump beam relative to the first axis in each of $dev_1$ through $dev_n$ to modify the efficiency of downconverted bi-photon production by each device, preferably to adjust the efficiency of downconverted bi-photon production in each of $dev_1$ through $dev_n$ to produce an approximately equal output of bi-photons in each device.

BRIEF DESCRIPTION OF THE DRAWINGS

The foregoing and other features of the present invention will become apparent to one skilled in the art to which the present invention relates upon consideration of the following description of the invention with reference to the accompanying drawings. Other embodiments of the invention will be apparent from the following detailed description, figures, and claims.

DETAILED DESCRIPTION OF THE INVENTION

Figure 1:
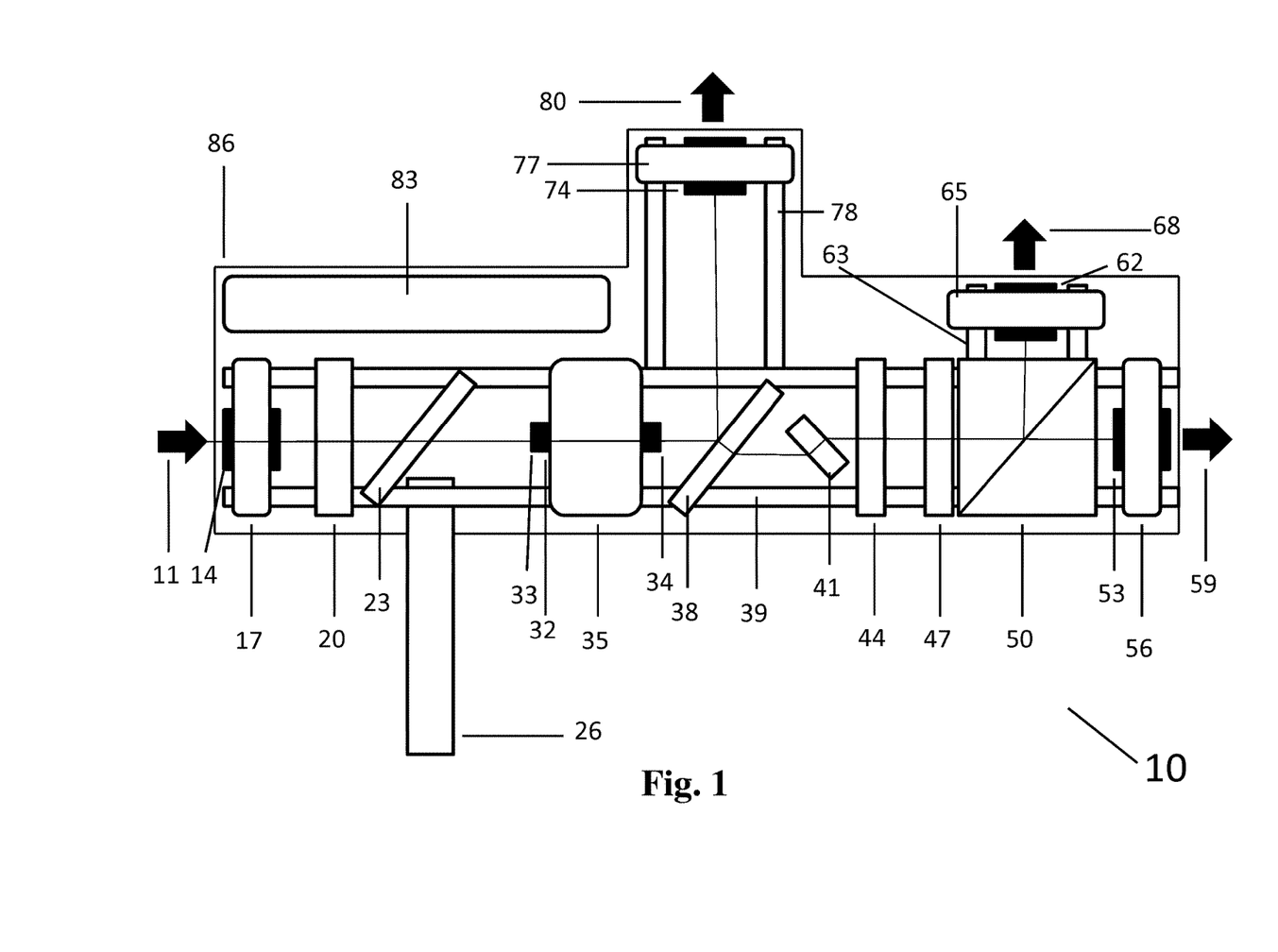
FIG. 1 depicts a schematic of a design of an exemplary system to generate quantum entangled photons in the quantum entangled "triplet state."

FIG. 1 depicts a schematic of a design of a system to generate quantum entangled photons 10. The system comprises a source side and a receiver side. The source side comprises a laser pump 11 that is delivered to the system through a fiber optic cable. In a preferred embodiment, the fiber optic cable is a singlemode, polarization-maintaining optical fiber, but can also be a multimode or singlemode non-polarization-maintaining fiber. The optical fiber is connected to the system through an optical fiber focusing device 14. The focusing device comprises one or more lens(es) to focus the fiber output. The focusing device 14 is mounted with a first translating mount 17. The first translating mount 17 allows the x-translation, y-translation, tip, tilt, and focal point placement of the fiber output to be precisely adjusted. In a preferred embodiment, adjustments are made through alignment screws in the mount and can be locked down with one or more set screws once all alignments are finalized.

The pump light is then directed through an optical filter 20 that eliminates any light not at the laser's target wavelength. A person of ordinary skill in the art would readily apprehend that the optical filter 20 can be a laser notch filter, bandpass filter, or long or short pass filter.

The focused laser light continues through a pellicle beamsplitter 23. The pellicle beamsplitter 23 splits off a first portion of the incident laser light, that first portion then being directed away from a camera 26 located nearby.

The remaining second portion of the incident laser light continues through the pellicle beamsplitter 23 and converges onto and into the non-linear crystal 32. The non-linear crystal has a first face 33 and a second face 34.

In a preferred embodiment, the non-linear crystal 32 is housed in a fixed mount 35 such that its alignment along the optical axis is precise to within 0.1° and stable. Preferably, the non-linear crystal 32 is potted in potting material having an index of refraction lower than the index of refraction of the non-linear crystal. Most preferably, the potting material has a low optical absorption coefficient (<0.01%/cm) to ensure minimal destructive heating when accidental misalignment of the laser occurs.

In a preferred embodiment, the crystal is potted in a cylindrical optical mount that is designed to interface with two precision, removable end-caps. The mount interfaces with each end-cap in such a way that the front region of the crystal (approximately 1 mm long) is captured by the first end-cap while the back region of the crystal (approximately 1 mm long) is captured by the second end-cap. This results in the crystal being carefully aligned and secured relative to the optical mount and creates a sealed mold that potting material can then be injected into. The potting compound is then poured into the mold through an injection port in the first end-cap and heat cured. The mold end-caps are removed once the final assembly has cured. The result is a very stable and precisely aligned crystal.

Light reflected from the first face 33 of the non-linear crystal 32 is reflected back toward the pellicle beamsplitter 23. However, as a person of ordinary skill in the art would readily apprehend the pellicle beamsplitter 23, directs the reflected light towards the camera 26. In a preferred embodiment, this back-reflected light facilitates the focus of the laser on the first face 33 of the non-linear crystal 32 to be imaged by the camera 26. This camera image is viewed and used in the final alignment of the focused laser light into the non-linear crystal 32. In a preferred embodiment, the camera 26 provides a real-time method for monitoring the centering of the focused laser beam onto and into the first face of the non-linear crystal.

As a person of ordinary skill in the art would readily apprehend, the non-linear crystal 32 may be comprised of a single crystal constructed from bulk non-linear materials (i.e. BBO, KTP, etc.), periodically-poled crystals (i.e., periodically-polled KTP (or "PPKTP")), or waveguide-structured crystals. The crystals may be fabricated to produce either Type 0, Type I, or Type II downconversion. In such embodiments, the polarization of the incident laser light would correspond with the axis of the crystal to result in bi-photon production.

In other preferred embodiments, the non-linear crystal may be comprised of more than one component non-linear crystal, wherein the crystal axes of each component non-linear crystal are oriented ninety degrees relative to one another in sequence.

In other preferred embodiments, the non-linear crystal may be comprised of two non-linear crystals separated by an intermediary half wave plate specified for the degenerate down-converted wavelength. In this arrangement, the crystal axes of each non-linear crystal are aligned. The intermediary half-wave plate would rotate the polarization of any down-conversion in the first crystal relative to the polarization of the down-conversion in the second crystal. The intermediary wave plate would have no impact on the polarization of the pump beam, which is half the wavelength of the down-conversion making the intermediary half-wave plate appear to be a whole wave-plate at the pump wavelength.

The non-linear crystal(s) 32 are mounted in a fixed mount 35 that rigidly positions the crystal 32 relative to the optical axis. The crystal will output photons that include both the laser's photon wavelength as well as the down-converted output from the non-linear crystal 32, which will generally be twice the wavelength of the laser. In a preferred embodiment, an optional electric heater 83 allows the temperature of the system to be increased and maintained at a given temperature, permitting the down-converted photon wavelength to be made degenerate or non-degenerate.

In a preferred embodiment, the output from the non-linear crystal 32 exits from the second face 34 and is directed toward a dichroic mirror 38. The dichroic mirror 38 separates the remaining laser pump beam from the down-converted photons. The laser pump beam reflects from the dichroic mirror 38 onto other parts of the system, as discussed further hereinafter.

The down-converted photons pass through the dichroic mirror 38 and are directed to a tilted window 41. The tilted window 41 is preferably designed to compensate for the axial shift in the optical axis introduced by the dichroic mirror, creating compensated down-converted photons. In a preferred embodiment, the tilted window is composed of quartz, but could be any variety of materials, including but not limited to Sapphire, BK7, and Magnesium Fluoride.

Optionally, in a preferred embodiment, the compensated down-converted photons continue through an optional compensating crystal 44 which has opposite birefringence properties compared to the non-linear crystal 32. The compensating crystal 44 can be composed of any variety of materials, including rotated KTP, $LiTaO_3$, and $YVO_4$ but is most preferably rotated KTP.

Also optionally, and in a preferred embodiment, the compensated down-converted photons then pass through a refining optical filter 47. The refining optical filter 47 is comprised of one or more optical filters and removes any remaining laser light or other unwanted light and noise from the signal. The refining optical filter 47 can be a laser notch filter, bandpass filter, or long or short pass filter, but is most preferably a bandpass filter.

Optionally, and in a preferred embodiment, an optional beamsplitter 50 splits the compensated down-converted bi-photons into two separate paths. In a preferred embodiment for applications involving post-selection of the down-converted photons, the optional beamsplitter 50 is a non-polarizing beamsplitter designed to operate at twice the wavelength pump laser. However, for other applications, including but not limited to the construction of heralded photons, decoherence free subspaces, and external combinations with other entangled source, the optional beamsplitter 50 would be a polarizing beamsplitter. For other applications, the beamsplitter 50 would be eliminated altogether, resulting in the collection and focusing of both down-converted photons into a single output optical fiber.

One output from the optional beamsplitter 50 directs light into an optional signal focusing element 62. In embodiments comprising the optional beamsplitter 50, there is preferably a signal focusing element 62, comprised of one or more lenses. In embodiments comprising the signal focusing element 62, it is preferably mounted in a signal 5-axis alignment mount 65 which facilitates its alignment relative to a fiber optic connector The signal focusing element 62 concentrates and focuses the light toward the attached fiber optic connector, creating a signal beam 68 that can be efficiently coupled into an attached single or multimode optical fiber.

The other output from the optional beamsplitter 50 directs light into an idler focusing element 53. In embodiments in which there is no optional beamsplitter 50, the photons from the non-linear crystal are directed to the idler focusing element 53. The idler focusing element 53 is comprised of one or more lenses mounted relative to a fiber optic connector and mounted in an idler 5-axis alignment mount 56. The idler focusing element 53 concentrates and focuses the light toward the attached fiber optic connector, creating an idler beam 59 that can be efficiently coupled into an attached single or multimode optical fiber.

In a preferred embodiment, the pump beam exiting the non-linear crystal 32 exits from the second face 34, is directed toward a dichroic mirror 38, and reflects down a separate optical path, creating a raw recycling beam.

The raw recycling beam is directed into a recycling optical focusing assembly 74. The recycling optical focusing assembly 74 is comprised of one or more optical lenses. The recycling optical focusing assembly 74 is preferably mounted in a second translating mount 77 that allows the focus to be carefully adjusted. In a preferred embodiment, the x-translation, y-translation, tip, tilt, and distance of the focus can all be adjusted through six alignment screws in the mount, and the final alignment can be locked in place through set screws.

The recycling optical focusing assembly 74 focuses the raw recycling beam, concentrating it into an optical fiber, creating a focused recycling beam 80. The focused recycling beam can optionally be used to excite the non-linear crystal 33 a second time, creating a temporal uncertainty that is useful for various forms of quantum entanglement, or optionally can be directed to a second system to generate additional photons, in which case that process can be repeated many times, greatly extending the application of the laser source. In other embodiments, the recycled beam could be used to monitor phase relations between the system and one or more other systems.

The first translating mount 17, optical filter 20, pellicle beamsplitter 23, camera 26, fixed mount 35, dichroic mirror 38, tilted window 41, optional compensating crystal 44, refining optical filter 47, optional beamsplitter 50, and idler 5-axis alignment mount 56 are held rigidly in place. In a preferred embodiment, that is accomplished in part by a cage design consisting of a first set of four bars that span the system at different points, one of which is indicated at 39.

The second translating mount 77 is also held rigidly in place. In a preferred embodiment, that is accomplished in part by a cage design consisting of a second set of four bars that span the system at different points, one of which is indicated at 78.

If present, the signal 5-axis alignment mount 65 is also held rigidly in place. In a preferred embodiment, that is accomplished in part by a cage design consisting of a third set of four bars that span the system at different points, one of which is indicated at 63.

Most preferably, the first, second and third cages are also held in place by rigid mounting of the components to a plate 86. A light-tight housing encompasses the entire assembly and mounts to the plate 86.

Figure 2:
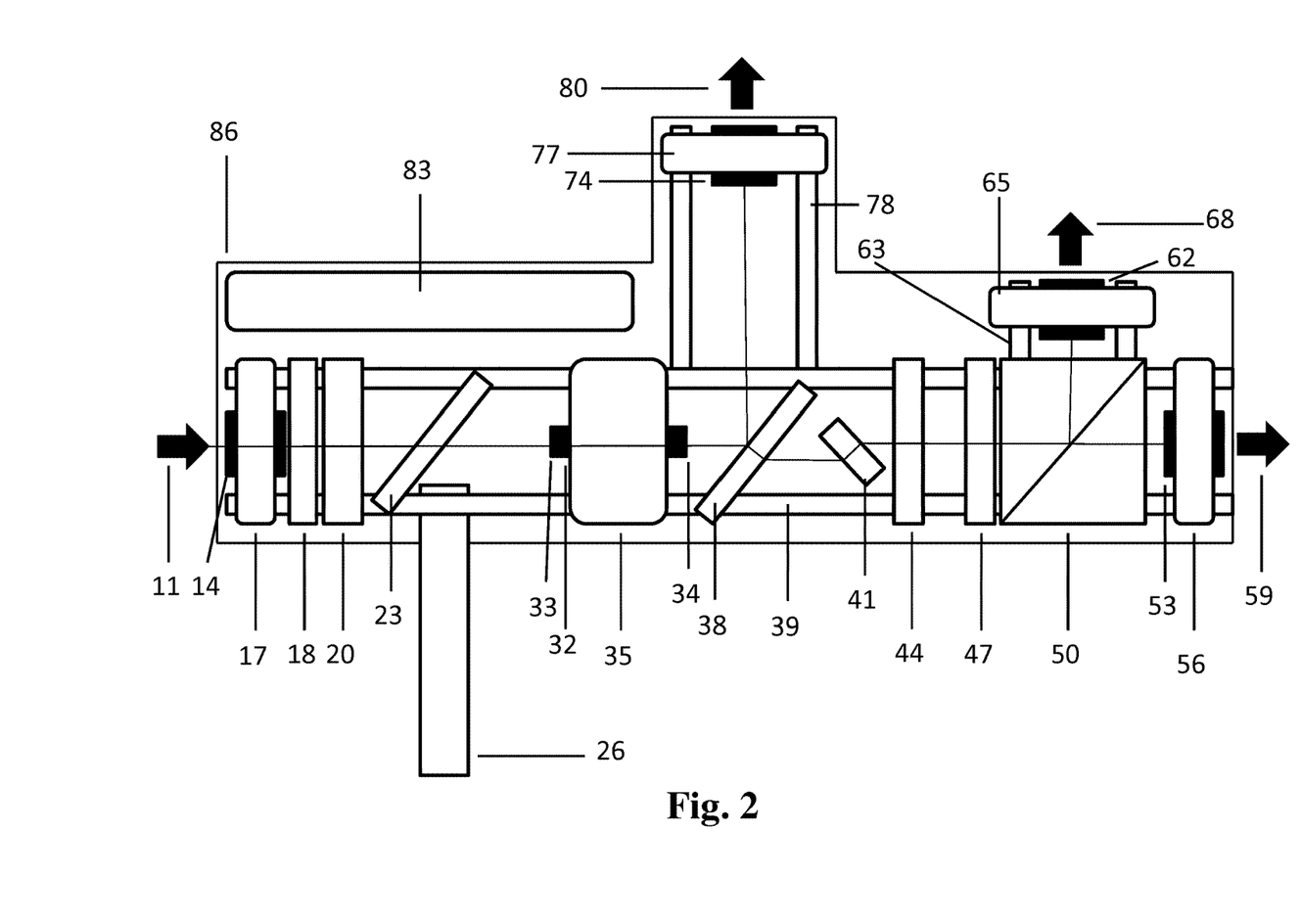
FIG. 2 depicts a schematic of a design of an exemplary system to generate quantum entangled photons in the quantum entangled "triplet state," incorporating an optional phase shifting wave plate.

FIG. 2 depicts a schematic of a design of a system, incorporating an optional phase shifting wave plate.

In the embodiment illustrated in FIG. 2, the focus of the laser is directed through an optional phase shifting wave plate 18. In a preferred embodiment shown in FIG. 2, the optional phase shifting wave plate 18 is located between the first translating mount 17 and the optical filter 20. However, the optional phase shifting wave plate 18 could be placed anywhere between photon source 11 and the first face of the non-linear crystal 33. In embodiments in which the optional phase shifting wave plate 18 is placed in between the pellicle beamsplitter 23 and the first face 32 of the non-linear crystal 32, the light reflected from the first face 32 passes through the optional phase shifting wave plate 18 on its way back to the pellicle beamsplitter 23.

In a preferred embodiment, the optional phase shifting wave plate 18 is a variable wave plate, preferably an electronically variable wave plate constructed from a liquid crystal device. The optional phase shifting wave plate is made of a material (such as a liquid crystal) that has a polarization dependent index of refraction that can be adjusted electrically. The optional phase shifting wave plate is oriented such that its optical fast axis is aligned with the polarization axis of the laser pump 11.

In a preferred embodiment, the optional phase shifting wave plate can be electronically adjusted to introduce a varying phase shift to the incoming pump beam. This arrangement allows the phase of the pump beam to be controlled relative to other systems, a process that is useful when the outputs from multiple systems are combined.

The optional phase shifting pre-crystal variable wave plate 18 is held rigidly in place. In a preferred embodiment, that is accomplished in part by a cage design consisting of a first set of four bars that span the system at different points, one of which is indicated at 39.

Figure 3:
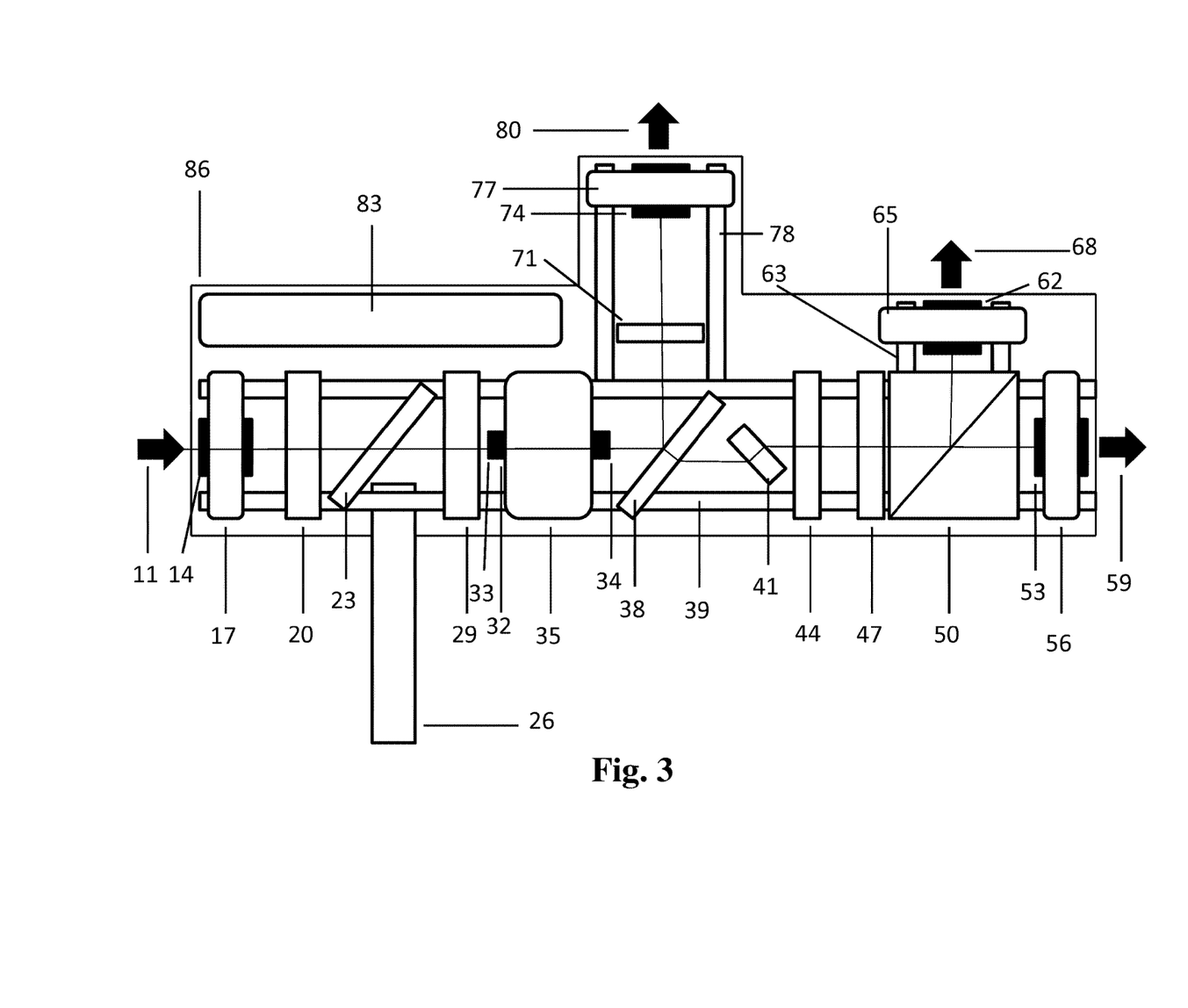
FIG. 3 depicts a schematic of a design of an exemplary system to generate quantum entangled photons in the quantum entangled "triplet state," incorporating an optional polarization rotating pre-crystal wave plate, and an optional polarization rotating recycling wave plate.

FIG. 3 depicts a schematic of a design of a system, incorporating an optional polarization rotating pre-crystal wave plate, and an optional polarization rotating recycling wave plate.

In a preferred embodiment illustrated by FIG. 3, the light passes through an optional polarization rotating pre-crystal wave plate 29 before converging onto and into the non-linear crystal. The optional polarization rotating pre-crystal wave plate 29 can either be configured manually (i.e. through a manual rotation) or electronically (i.e. through a liquid crystal medium or other optical phase manipulating media). The optional polarization rotating pre-crystal wave plate allows the polarization of the pump beam to be modified, having the result of reducing the down conversion efficiency production of the non-linear crystal 32.

In a preferred embodiment shown in FIG. 3, the light passes through an optional polarization rotating pre-crystal wave plate 29. The optional polarization rotating pre-crystal wave plate 29 is preferably located, as illustrated in FIG. 3, between the pellicle beamsplitter 23 and the first face 33 of the non-linear crystal 32. However, optional polarization rotating pre-crystal wave plate 29 is could be placed anywhere between photon source 11 and the first face of the non-linear crystal 33.

In a preferred embodiment illustrated by FIG. 3, light reflected from the first face 33 of the non-linear crystal 32 is reflected back toward the pellicle beamsplitter 23, and passes through the optional polarization rotating pre-crystal wave plate 29 on its way to the pellicle beamsplitter 23.

In other preferred embodiments, the non-linear crystal 32 may be comprised of more than one component non-linear crystal, wherein the crystal axes of each component non-linear crystal are oriented ninety degrees relative to one another in sequence. In these embodiments, the polarization of the incident light is preferably modified by an optional polarization rotating pre-crystal wave plate 29 to be at a forty-five degree angle to each of the component non-linear crystal axes.

In other preferred embodiments, the non-linear crystal 32 may be comprised of two non-linear crystals, separated by an intermediary half wave plate specified for the degenerate down-converted wavelength. In these embodiments, the crystal axes of each non-linear crystal are aligned. The optional polarization rotating pre-crystal wave plate 29 would be a half-wave plate oriented 45 degrees relative to the crystal axes. The intermediary half-wave plate would rotate the polarization of any down-conversion in the first crystal relative to the polarization of the down-conversion in the second crystal. The intermediary wave plate would have no impact on the polarization of the pump beam, which is half the wavelength of the down-conversion making the intermediary half-wave plate appear to be a whole waveplate at the pump wavelength.

In a preferred embodiment illustrated in FIG. 3, the pump beam exiting the non-linear crystal 32 exits from the second face 34, is directed toward a dichroic mirror 38, and reflects down a separate optical path. The laser pump beam photons are reflected by the dichroic mirror toward an optional polarization rotating recycling wave plate 71. The optional polarization rotating recycling-wave plate 71 is preferably selected in accordance with the laser wavelength, and can be used to reverse the effect of any polarization rotation produced in the optional polarization rotating pre-crystal wave plate 23, creating a polarized raw recycling beam.

The polarized raw recycling beam is directed into a recycling optical focusing assembly 74. The recycling optical focusing assembly 74 is comprised of one or more optical lenses. The recycling optical focusing assembly 74 is preferably mounted in a second translating mount 77 that allows the focus to be carefully adjusted. In a preferred embodiment, the x-translation, y-translation, tip, tilt, and distance of the focus can all be adjusted through six alignment screws in the mount, and the final alignment can be locked in place through set screws.

The recycling optical focusing assembly 74 focuses the polarized raw recycling beam, concentrating it into an optical fiber, creating a focused recycling beam 80. In a preferred embodiment, the focused recycling beam 80 can optionally be used to excite the non-linear crystal 33 a second time, creating a temporal uncertainty that is useful for various forms of quantum entanglement, or optionally can be directed to a second system to generate additional photons, in which case that process can be repeated many times, greatly extending the application of the laser source. In other embodiments, the recycled beam could be used to monitor phase relations between the system and one or more other systems.

The optional polarization rotating pre-crystal wave plate 29 is held rigidly in place. In a preferred embodiment, that is accomplished in part by a cage design consisting of a first set of four bars that span the system at different points, one of which is indicated at 39.

The polarization rotating recycling wave plate 71 and second translating mount 77 are also held rigidly in place. In a preferred embodiment, that is accomplished in part by a cage design consisting of a second set of four bars that span the system at different points, one of which is indicated at 78.

Figure 4:
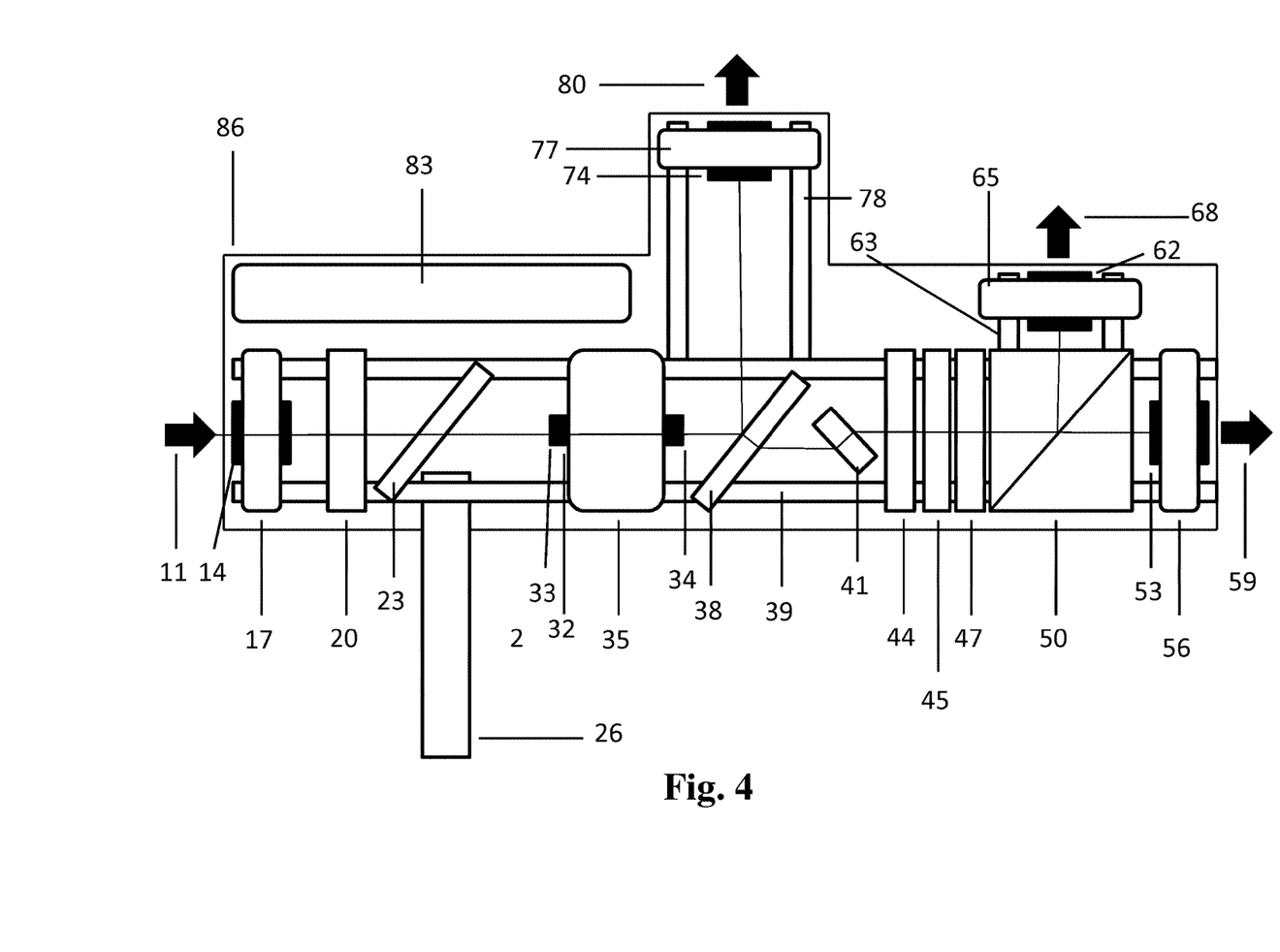
FIG. 4 depicts a schematic of a design of an exemplary system to generate quantum entangled photons in the quantum entangled "triplet state," incorporating an optional polarization rotating post-crystal wave plate.

FIG. 4 depicts a schematic of a design of a system, incorporating an optional polarization rotating post-crystal wave plate 45.

In a preferred embodiment illustrated by FIG. 4, the light passes through an optional polarization rotating post-crystal wave plate 45 before being focused onto and into the idler focusing element 53. In embodiments in which the optional beamsplitter 50 is incorporated, the light passes through the optional polarization rotating post-crystal wave plate 45 prior to the optional beamsplitter 50. Preferably, optional polarization rotating post-crystal wave plate 45 is placed between the titled window 41 (or the optional compensating crystal 44, if present) and the refining optical filter 47, as illustrated in FIG. 4. However, the optional polarization rotating post-crystal wave plate 45 may be placed anywhere between the second face 34 of the non-linear crystal 32 and the optional beamsplitter 50 (if present) or the idler focusing element 53 (if the optional beamsplitter 50 is not present).

The optional polarization rotating post-crystal wave plate 45 can either be fixed or variable, and may be configured manually (i.e. through a manual rotation) or electronically (i.e. through a liquid crystal medium or other optical phase manipulating media).

The optional polarization rotating post-crystal wave plate 45 rotates the polarization of the compensated down-converted photons. The optional polarization rotating post-crystal wave plate can be rotated either manually or through electronic means and media in a number of ways readily-comprehensible to persons of ordinary skill in the art, some of which are discussed above in connection with other wave plates. In a preferred embodiment, the optional polarization rotating post-crystal wave plate 45 is an electronically-adjustable liquid crystal device placed after the non-linear crystal 32.

Figure 5:
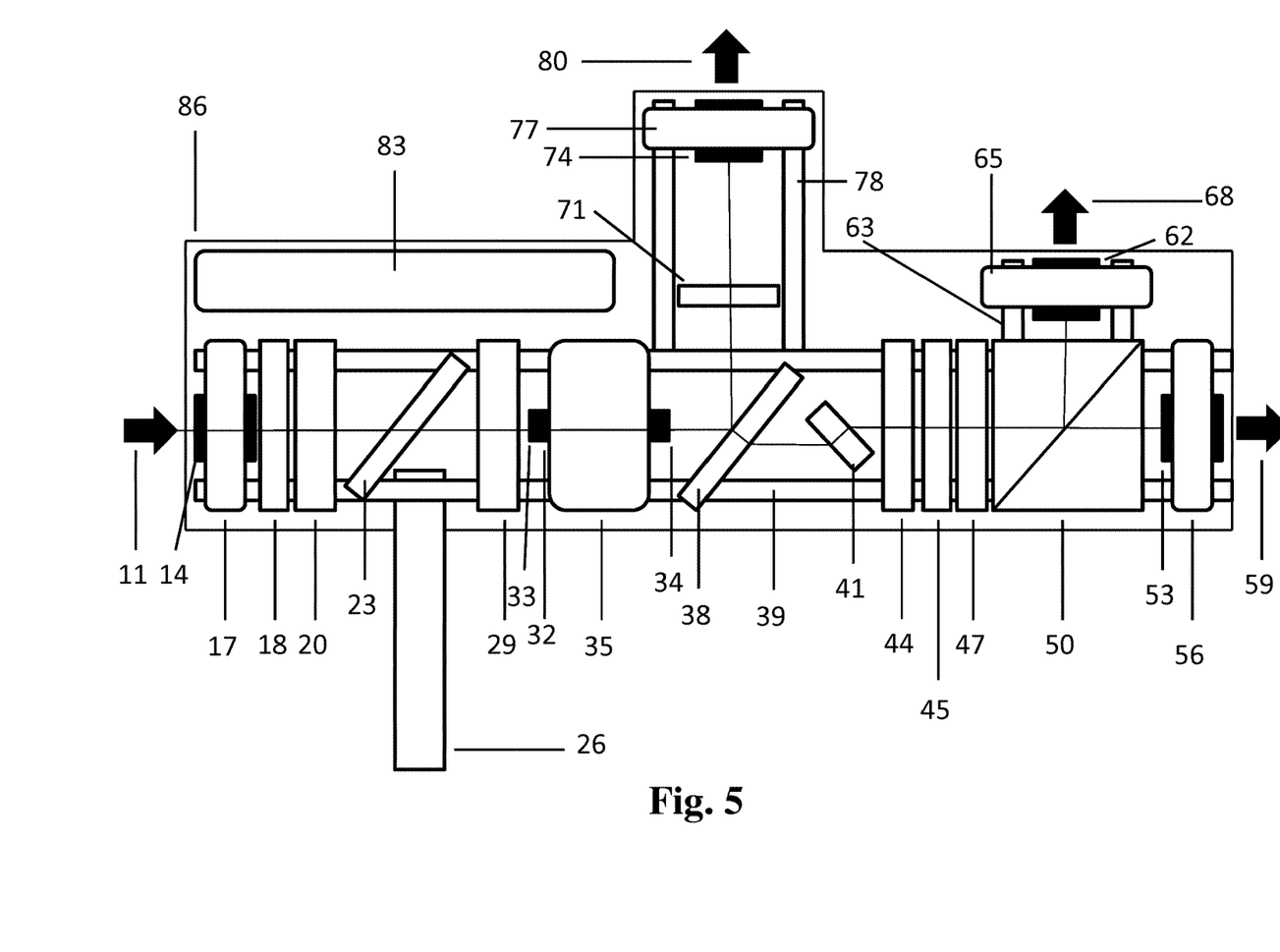
FIG. 5 depicts a schematic of a design of an exemplary system to generate quantum entangled photons in the quantum entangled "triplet state," incorporating an optional phase shifting wave plate, an optional polarization rotating pre-crystal wave plate, an optional polarization rotating post-crystal wave plate, and an optional polarization rotating recycling wave plate.

FIG. 5 depicts a schematic of a design of a system, incorporating an optional phase shifting wave plate, an optional polarization rotating pre-crystal wave plate, an optional polarization rotating post-crystal wave plate, and an optional polarization rotating recycling wave plate. In this preferred embodiment, an optional phase shifting wave plate 18, an optional polarization rotating pre-crystal wave plate 29, an optional polarization rotating post-crystal wave plate 45, and an optional polarization rotating recycling wave plate 71 are all utilized and discussed and taught above.

An aspect of the present invention relates to the manner of aligning the system. In a preferred embodiment, alignment of the system 10 is achieved through a three-stage process.

Figure 6:
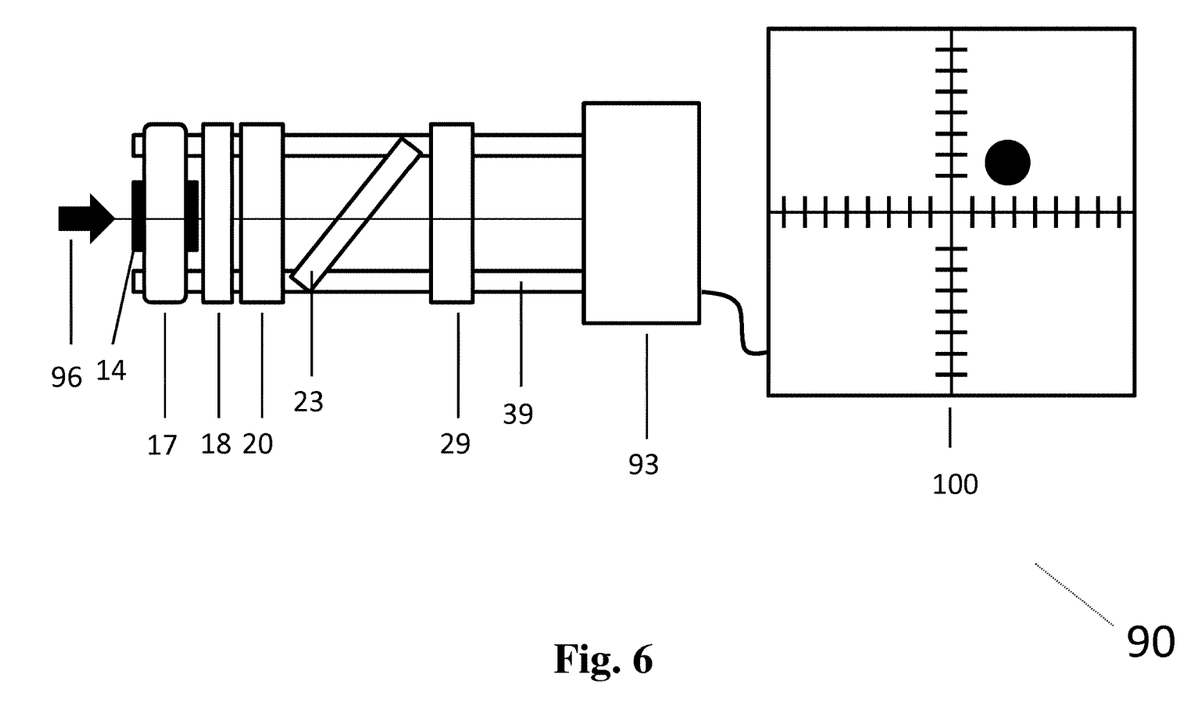
FIG. 6 depicts an exemplary alignment of one sub-assembly of the system to generate quantum entangled photons—referred to herein as "the source side."

The alignment process can be understood with reference to FIG. 6, which depicts a first sub-assembly 90, also referred to as the "source side" sub-assembly. The first sub-assembly comprises the optical fiber focusing device 14, the first translating mount 17, the optical filter 20, and the pellicle beamsplitter 23, and a beam profiler 93. The beam profiler 93 can be readily obtained from commercial sources, including Thorlabs. Optionally, as discussed above, the first sub-assembly may comprise one or more of the following: an optional phase shifting wave plate 18, and/or an optional polarization rotating pre-crystal wave plate 29.

The beam profiler 93 is rigidly, but temporarily, affixed to the other components using a portion of the first set of bars 39 described earlier and is placed such that its detection surface is at the precise focal length at which the mid-point between the first face 33 and the second face 34 of the non-linear crystal 32 will be located in the assembled system.

Light from a fiber optic laser 96 of the same wavelength that will be used for the pump beam 11 is directed at the same location on the surface of the optical fiber focusing device 14 of the first sub-assembly 90 which to produce a focused spot of light that is detected by the beam profiler 93. As is readily appreciated by persons of ordinary skill in the art, the beam profiler 93 can then determine the location, diameter, optical power, and divergence of the spot, as partially schematically illustrated as the beam profiler output 100.

Although the beam profiler output 100 is schematically illustrated in FIG. 2, persons of ordinary skill in the art will readily apprehend that beam profilers can and do output data in a variety of formats, providing, as noted above, a great deal more information than location and diameter. The schematic illustration is provided for graphic illustration and is not intended to convey the full output available nor limit the teachings of the present invention in any manner.

The output from the beam profiler 93 is then monitored as alignment adjustments are made to the translating mount 17 and used to exactly focus the light from fiber optic laser 96 so that the light will be maximally-focused through the optical fiber focusing device 14, the optional phase shifting pre-crystal variable, if present 18, the optical filter 20, the pellicle beamsplitter 23, and the optional polarization rotating pre-crystal wave plate 29, if present, at the focal distance to be utilized when the beam profiler 93 is removed and replaced by the non-linear crystal 32 in its mounting 35.

Figure 7:
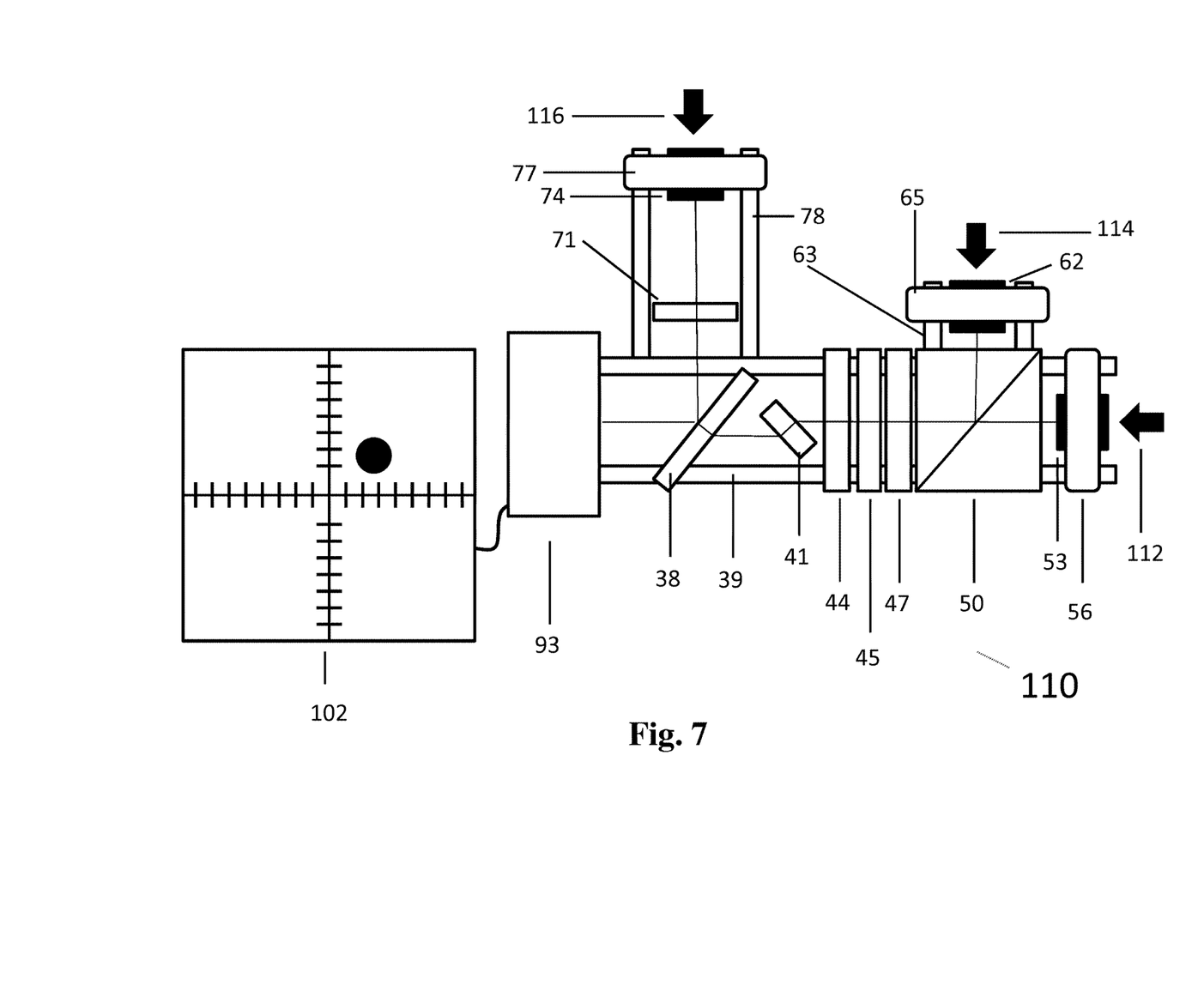
FIG. 7 depicts an exemplary alignment of a second sub-assembly of the system to generate quantum entangled photons—referred to herein as "the receiver side."

The second phase of the alignment and assembly process can be understood with reference to FIG. 7. FIG. 7 depicts a second sub-assembly 110, also referred to as the "receiver-side" sub-assembly. The second sub-assembly comprises: the beam profiler 93, the dichroic mirror 38, the recycling optical focusing assembly 74, the second translating mount 77, the tilted window 41, idler focusing element 53, and the idler 5-axis alignment mount 56, all affixed, directly or indirectly as discussed above, by portions of the first set of bars 39. Optionally, as also discussed above, the second sub-assembly may comprise one or more of the following: an optional compensating crystal 44, an optional polarization rotating post-crystal wave plate 45, an optional refining optical filter 47, an optional beamsplitter 50, an optional signal focusing element 62, the optional the signal 5-axis alignment mount 65, and/or the optional polarization rotating recycling wave plate 71, which may be affixed, as discussed above, using portions of the first, second, and/or third set of bars 39, 78, and/or 63.

To assemble and align the second sub-assembly 110, the beam profiler 93 is rigidly, but temporarily affixed to the dichroic mirror 38 at a distance such that its detection surface is exactly the length from the dichroic mirror 38 that the mid-point between the first face 33 and second face 34 of the non-linear crystal 32 will be in the final assembly when the non-linear crystal 32 is affixed where the beam profiler 93 is shown in FIG. 7.

The idler focusing element 53 is aligned. Idler focusing element tuning light 112 is introduced. The idler focusing element tuning light 112 is light from a laser with a wavelength equal to the down-converted photons to be produced, introduced at the spot on the idler focusing element 53 that will emit the down-converted photons in the final assembly. That light will pass through the assembled elements and a portion will eventually reach the beam profiler 93. As explained previously, the beam profiler will produce and display data regarding the location, diameter, optical power, and divergence of the spot, as partially schematically illustrated as the beam profiler output 102. Adjustments to the idler 5-axis alignment mount 56 can be made to focus the beam onto the beam profiler 93 and optical axis of the second sub-assembly 110.

If present, the signal focusing element 62 is aligned. Signal focusing element tuning light 114 is then introduced. The signal focusing element tuning light 114 is light from a laser with a wavelength equal to the down-converted photons to be produced, introduced at the spot on the signal focusing element 62 that will emit the down-converted photons in the final assembly. That light will pass through the assembled elements and a portion will eventually reach the beam profiler 93. As explained previously, the beam profiler will produce and display data regarding the location, diameter, optical power, and divergence of the spot, as partially schematically illustrated as the beam profiler output 102. Adjustments to the signal 5-axis alignment mount 65 can be made to focus the beam onto the beam profiler 93 and optical axis of the second sub-assembly 110.

The recycling optical focusing assembly 74 is aligned. Recycling focusing element tuning light 116 is then introduced. The recycling focusing element tuning light 116 is laser light of the same wavelength that will be used for the pump beam 11. That light will pass through the assembled elements and a portion will eventually reach the beam profiler 93. As explained previously, the beam profiler will produce and display data regarding the location, diameter, optical power, and divergence of the spot, as partially schematically illustrated as the beam profiler output 102. Adjustments to the second translating mount 77 can be made to focus the beam onto the beam profiler 93 and optical axis of the second sub-assembly 110.

The third phase of alignment and assembly is then performed. The beam profiler 93 is removed from the sub-assembly(ies). The fixed mount 35 containing the non-linear crystal 32 is then affixed between the first and second sub-assemblies as illustrated in FIG. 1, where the beam profiler 93 had been during the assembly and alignment of the first and second sub-assemblies. The camera 26 is also attached to the assembly, and optionally, the electric heater 83.

Light at the pump wavelength 11 is brought into the system 10 as discussed above and focused onto the non-linear crystal 32. The laser light is visible on the first face 33 and is translated in the x and y axis, using x and y adjustments in the translating mount 17, but not the focal axis, to perfectly center the focal spot onto the first face 33 of the non-linear crystal.

The idler beam 59, signal beam 68, and/or focused recycling beam 80, are then collected into optical fibers and connected to detectors. The x and y translation of the focusing elements can then be tuned. The x and y translation of the idler focusing element 53 can be optimized by adjusting the x and y translation in the idler 5-axis alignment mount 56 to optimize the idler beam as desired. The x and y translation of the signal focusing element 65 can be optimized by adjusting the x and y translation in the signal 5-axis alignment mount 65 to optimize the signal beam as desired. The x and y translation of the recycling optical focusing assembly 74 can be optimized by adjusting the x and y translation in the second translating mount 77 to optimize the focused recycling beam as desired.

In a preferred embodiment, the idler beam 59 and the signal beam 68 are directed to a coincidence detector, most preferably by fiber optic couplers. The coincidence detector can determine when photons have arrived simultaneously at these two ports. The coincidence rate of the two fiber optic outputs can then be monitored and maximized through x and y translation adjustments on the idler 5-axis alignment mount 56 and/or the signal 5-axis alignment mount 65.

Most preferably, when fully aligned, the mounts are locked in place through set screws on each mount's alignment screws. The housing for the assembly is then positioned in place and attached to the systems base plate 86, preferably with screws. The systems base plate 86 and housing serve to protect the optics and preserve the alignment within while also eliminating unwanted outside light from being collected into the fiber optics.

Using the system and methods disclosed herein permits production of bi-photons at a rate as high as 1 million pairs per second per mW of pump power from two 20 mm long PPKTP crystals. Using the system and methods disclosed herein permits a single system to produce entangled photons in the quantum entangled triplet state using post selection.

Figure 8:
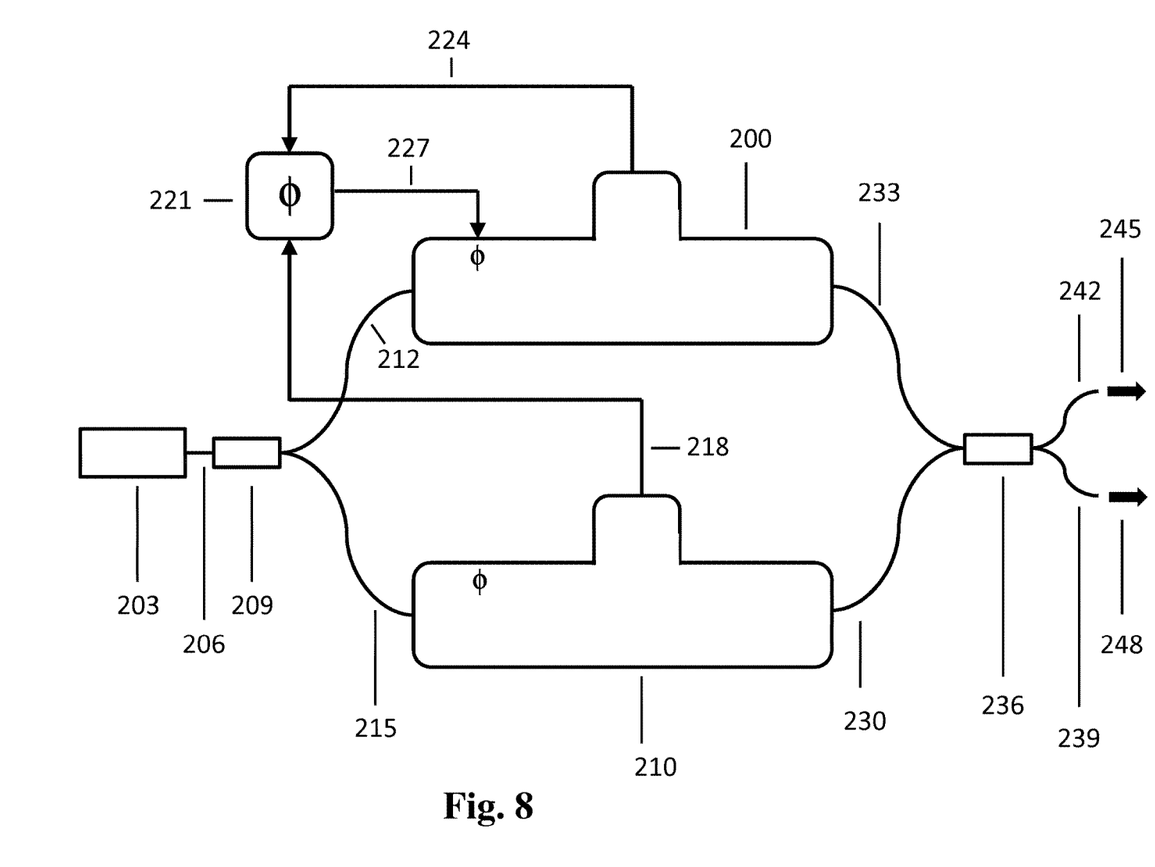
FIG. 8 depicts an exemplary array used to generate quantum entangled photons which are being excited by the same pump beam. In the depicted example, the outputs of the two systems are combined for the purpose of producing the quantum entangled photons in the quantum entangled "singlet state."

As illustrated schematically in FIG. 8, two systems for generating polarization entangled photons in the "triplet state" can be driven from the same pump beam to create a combined output of photons in the quantum polarization entangled "singlet state" without the need for post-selection.

In such embodiments, a first system 210 is assembled in accordance with the present invention. As discussed previously, that system may be system 10, as illustrated in FIG. 1 with or without the optional elements, or may be a system with one or more of the optional elements illustrated by the examples of FIGS. 2 through 4, inclusive, or could be a system as illustrated in FIG. 5. Most preferably, system 210 is a system as illustrated in FIG. 5, without the optional beamsplitter 50, the signal focusing element 62, or optional fiber optic alignment mount 65. Similarly, in such embodiments, a second system 200 is also utilized. System 200 may be system 10, as illustrated in FIG. 1 with or without the optional elements, or may be a system with one or more of the optional elements illustrated by the examples of FIGS. 2 through 4, inclusive, or could be a system as illustrated in FIG. 5, but is most preferably a system as illustrated in FIG. 5, without the optional beamsplitter 50, the signal focusing element 62, or optional fiber optic alignment mount 65.

In a preferred embodiment, a pump laser 203 provides light through a polarization-maintaining optical fiber 206 to a polarization-maintaining fiber optic splitter 209. The fiber optic splitter 209 produces two copies of the pump beam, each of which is connected through optical fibers to each of the quantum entanglement generating systems 210, 200. In a preferred embodiment, both systems 200 and 210 are identical. Most preferably, both systems 200 and 210 comprise an optional phase shifting wave plate 18, and an optional beamsplitter 50. Most preferably, the systems 200 and 210 do not have the optional beamsplitter 50, the signal focusing element 62, or optional fiber optic alignment mount 65 and hence, do not generate a separate signal beam 6868.

In this embodiment, the pair of bi-photons produced by a single unit's non-linear crystal would have opposite polarization and would be coupled into a single outgoing optical fiber. The bi-photons emitted by system 210 would be coupled into fiber 230. The bi-photons emitted by system 200 would be coupled into fiber 233. The output fibers 230 and 233 would be combined at a 2×2 fiber optic polarization beamsplitter 236. The outputs from the fiber optic polarization beamsplitter's output fibers 242 and 239 would contain the polarization entangled photons in the "singlet state" (outputs 245 and 248).

In order to maintain a stable output of the "singlet state," the phase difference between the two pump beams' exciting systems must be monitored and maintained. To do this, the recycled outputs of the pump laser beam from systems 210 and 200 are preferably coupled into single-mode polarization-maintaining optical fibers 218 and 224. These fibers direct the recycled outputs to a phase monitoring and control system 221. In a preferred embodiment, the phase monitoring control system is a Mach-Zehnder interferometer, such as one commercially-available from Thorlabs, that would provide a measurement of the phase difference between the pump beams of the two systems 200 and 210. In a preferred embodiment, the output from the phase monitoring control system would be fed back through an electrical coaxial cable 227 into the optional phase shifting wave plates 18 of either system 210 (as illustrated in FIG. 8) or system 200. Most preferably, the optional phase shifting wave plate 18 is electronically adjustable to compensate for any fluctuation in phase difference between the photons generated by system 200 and system 210.

While the invention has been described and exemplified in sufficient detail for those skilled in this art to make and use it, various alternatives, modifications, and improvements should be apparent without departing from the spirit and scope of the invention. The examples provided herein are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

It will be readily apparent to a person skilled in the art that varying substitutions and modifications may be made to the invention disclosed herein without departing from the scope and spirit of the invention.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Other embodiments are set forth within the following claims.

We claim:

1. A device for generating bi-photons and/or entangled photons, comprising:
   a nonlinear crystal element comprising a first face, a second face parallel to the first face, and a first axis perpendicular to the first and second faces;
   a photon source configured to provide a pump beam traversing a first optical path to a first face of the nonlinear crystal element along the first axis, the nonlinear crystal element providing downconversion of a subset of photons in the pump beam to provide downconverted photons and non-downconverted photons;
   a beam splitter positioned in the first optical path between the photon source and the first face of the nonlinear crystal element, the beam splitter configured to direct photons reflected from the first face of the nonlinear crystal element onto a second optical path along a second axis;
   a beam profiler configured to receive photons traversing the second optical path from the beam splitter and to provide therefrom an image of the first face of the nonlinear crystal element;
   a focusing optic configured to provide adjustment of the position of the pump beam relative to the first axis;
   an optical element comprising a dichroic reflector configured to receive photons exiting a second face of the nonlinear crystal element along the first axis and to direct downconverted photons to a third optical path along the first axis, and to direct non-downconverted photons to a fourth optical path along a third axis.

2. A device according to claim 1, further comprising a first wave plate that is a variable wave plate positioned in the first optical path between the photon source and the first face of the nonlinear crystal element, the first wave plate configured to adjustably modify a polarization state of the pump beam, thereby altering the efficiency of downconverted photon production by the system.

3. A device according to claim 2, further comprising a second wave plate positioned in the first optical path between the photon source and the first face of the nonlinear crystal element.

4. A device according to claim 3, wherein the second wave plate is an electronically variable wave plate, the electronically variable wave plate configured to allow modification of the optical phase of the pump beam, thereby altering the optical phase of the downconverted photons.

5. A device according to claim 3, wherein the second wave plate is a fixed wave plate configured to allow modification of the optical phase of the pump beam, thereby altering the optical phase of the downconverted photons.

6. A device according to claim 3, wherein the second wave plate is positioned between the photon source and the wave plate.

7. A device according to claim 3, wherein the second wave plate is positioned between the wave plate and the first face of the nonlinear crystal element.

8. A device according to claim 1, wherein the photon source is a laser optically coupled to an optical fiber at a first end of the optical fiber, wherein the pump beam exits the optical fiber at a second end thereof, and wherein the second end of the optical fiber is positioned within a translating mount to provide the beam to the focusing optic.

9. A device according to claim 8, wherein the translating mount is configured to align the pump beam along first axis.

10. A device according to claim 1, further comprising a filter positioned in the first optical path between the photon source and the beam splitter, the filter configured to remove undesired wavelengths of light from reaching the beam splitter.

11. A device according to claim 1, wherein the beam profiler comprises a CCD image sensor.

12. A device according to claim 3, wherein the second wave plate is a half-wave plate.

13. A device according to claim 1, wherein the nonlinear crystal element is potted in potting material having an index of refraction lower than the index of refraction of the non-linear crystal.

14. A device according to claim 13, wherein the potting material is silicone-based rubber.

15. A device according to claim 1, wherein the nonlinear crystal element produces Type 0 downconversion.

16. A device according to claim 1, wherein the nonlinear crystal element produces Type I downconversion.

17. A device according to claim 1, wherein the nonlinear crystal element produces Type II downconversion.

18. A device according to claim 1, wherein the nonlinear crystal element is a composite of two non-linear crystals separated by a half wave plate.

19. A device according to claim 1, wherein the nonlinear crystal element is a composite of a plurality of non-linear crystals, each having a crystal axis oriented ninety degrees relative to an adjacent non-linear crystal.

20. A device according to claim 1, wherein the fourth optical path comprises an optical element configured to focus the non-downconverted photons onto an end of a second optical fiber.

21. A device according to claim 1, further comprising a second beam splitter positioned along the third optical path and configured to receive downconverted bi-photons and direct individual bi-photons in a bi-photon pair along separate optical paths.

22. An array comprising a plurality of devices according to claim 1, wherein non-downconverted photons from the fourth optical path of a first device in the array is utilized as the photon source in a second device in the array.

23. A device according to claim 1, wherein non-downconverted photons from the fourth optical path are combined with the pump beam and directed along the first optical path as part of the pump beam.

24. A method of providing a scalable photon source, comprising:
providing devices $dev_1$ through $dev_n$ according to claim 1, wherein n=at least 2, wherein $dev_1$ comprises a laser as the photon source and $devs_{2\ to\ n}$ utilize non-downconverted photons from the fourth optical path of $dev_1$ as the photon source; and
adjusting the polarization of the pump beam relative to the first axis in each of $dev_1$ through $dev_n$ to modify the efficiency of downconverted photon production by each device.

25. A method according to claim 24, further comprising adjusting the efficiency of downconverted photon production in each of $dev_1$ through $dev_n$ to produce an equal output of downconverted photons from each device.

* * * * *